US011390315B2

(12) United States Patent
Breuer et al.

(10) Patent No.: US 11,390,315 B2
(45) Date of Patent: Jul. 19, 2022

(54) TOOTHED SHAFTS FOR INSTALLATION INTO HOLLOW SHAFTS WITH INTERNAL TOOTHINGS IN TELESCOPIC FASHION

(71) Applicants: THYSSENKRUPP PRESTA AG, Eschen (LI); thyssenkrupp AG, Essen (DE)

(72) Inventors: Marius Breuer, Fishers, IN (US); Janick Durot, Widnau (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 861 days.

(21) Appl. No.: 16/082,320

(22) PCT Filed: Feb. 28, 2017

(86) PCT No.: PCT/EP2017/054621
§ 371 (c)(1),
(2) Date: Sep. 5, 2018

(87) PCT Pub. No.: WO2017/153208
PCT Pub. Date: Sep. 14, 2017

(65) Prior Publication Data
US 2019/0092370 A1 Mar. 28, 2019

(30) Foreign Application Priority Data
Mar. 7, 2016 (DE) .................. 10 2016 203 627.0

(51) Int. Cl.
*B62D 1/185* (2006.01)
*B62D 1/20* (2006.01)
(Continued)

(52) U.S. Cl.
CPC ........ *B62D 1/185* (2013.01); *B29C 45/14065* (2013.01); *B29C 45/14336* (2013.01);
(Continued)

(58) Field of Classification Search
CPC .. B62D 1/185; B62D 1/16; B62D 1/20; B29C 45/14065; B29C 45/14336;
(Continued)

(56) References Cited

U.S. PATENT DOCUMENTS

| 3,063,763 A | * | 11/1962 | Zubrisky | ................. F16C 33/12 |
| | | | | 384/42 |
| 3,367,142 A | * | 2/1968 | Groves | ..................... F16D 3/06 |
| | | | | 464/162 |
| 2019/0092370 A1 | * | 3/2019 | Breuer | .............. B29C 45/14426 |

FOREIGN PATENT DOCUMENTS

| CN | 1139472 C | 1/1997 |
| CN | 101096213 A | 1/2008 |

(Continued)

OTHER PUBLICATIONS

RTP Engineering Plastics, Nylon 6/6, retrieved from the Internet Oct. 20, 2021 at <www.rtpcompany.com.>. (Year: 2021).*
(Continued)

*Primary Examiner* — Greg Binda
(74) *Attorney, Agent, or Firm* — thyssenkrupp North America, LLC

(57) ABSTRACT

A toothed shaft can be installed in a hollow shaft that has an internal toothing such that the toothed shaft is coupled in a positively locking fashion so as to be telescopic in a direction of a longitudinal axis. The toothed shaft may include a toothing region with teeth on an outer circumference and extending in an axial direction. In the toothing region a shaft core may be overmolded by way of an injection molding process with a sliding coating comprised of thermoplastic material. The sliding coating may have at least three impressions, with each of the at least three impressions featuring an aperture that extends through the sliding coating to a surface of the shaft core.

18 Claims, 8 Drawing Sheets

(51) Int. Cl.
  *B29C 45/14* (2006.01)
  *B29C 45/33* (2006.01)
  *B29C 45/44* (2006.01)
  *F16D 3/06* (2006.01)
  *F16C 3/03* (2006.01)
  *B62D 1/16* (2006.01)
  *B29C 45/00* (2006.01)

(52) U.S. Cl.
  CPC .. *B29C 45/14426* (2013.01); *B29C 45/14622* (2013.01); *B29C 45/33* (2013.01); *B29C 45/44* (2013.01); *B62D 1/16* (2013.01); *B62D 1/20* (2013.01); *F16C 3/03* (2013.01); *F16D 3/06* (2013.01); *B29C 2045/0027* (2013.01); *F16C 2223/42* (2013.01); *F16C 2226/80* (2013.01); *F16C 2326/24* (2013.01); *F16D 2250/0046* (2013.01); *F16D 2300/10* (2013.01); *Y10T 403/7035* (2015.01)

(58) Field of Classification Search
  CPC ........ B29C 45/14426; B29C 45/14622; B29C 45/33; B29C 45/44; B29C 2045/0027; F16C 3/03; F16C 2223/42; F16C 2226/80; F16C 2326/24; F16D 3/06; F16D 2250/0046; F16D 2300/10; Y10T 403/7035
  USPC ............................................. 464/162; 384/42
  See application file for complete search history.

(56) References Cited

FOREIGN PATENT DOCUMENTS

| | | |
|---|---|---|
| CN | 201679848 U | 12/2010 |
| DE | 12 79 326 B | 10/1968 |
| DE | 21 32 995 A | 1/1972 |
| DE | 102013020599 A | 6/2015 |
| DE | 102014103879 A | 9/2015 |
| DE | 10 2014 105 822 A | 10/2015 |
| DE | 102014106259 A | 11/2015 |
| ES | 2381826 A | 6/2012 |
| FR | 2 432 380 A | 2/1980 |
| GB | 2316150 A | 2/1998 |
| JP | H07 156190 A | 6/1995 |
| JP | H09 122814 A | 5/1997 |
| JP | 2010 060002 A | 3/2010 |
| JP | 2013141957 A | 7/2013 |

OTHER PUBLICATIONS

English Translation of International Search Report issued in PCT/EP2017/054621, dated May 24, 2017 (dated Jun. 30, 2017).
Anonymous: "#055 Designing the Tip Shape of Pin Point Gate, Technical Tutorial—Misumi", Sep. 10, 2010, pp. 1-2, XP055808377, URL: https://www.misumi-techcentral.com/tt/en/mold/2010/09/055-designing-the-tip-shape-of-pin-point-gate.html.

* cited by examiner

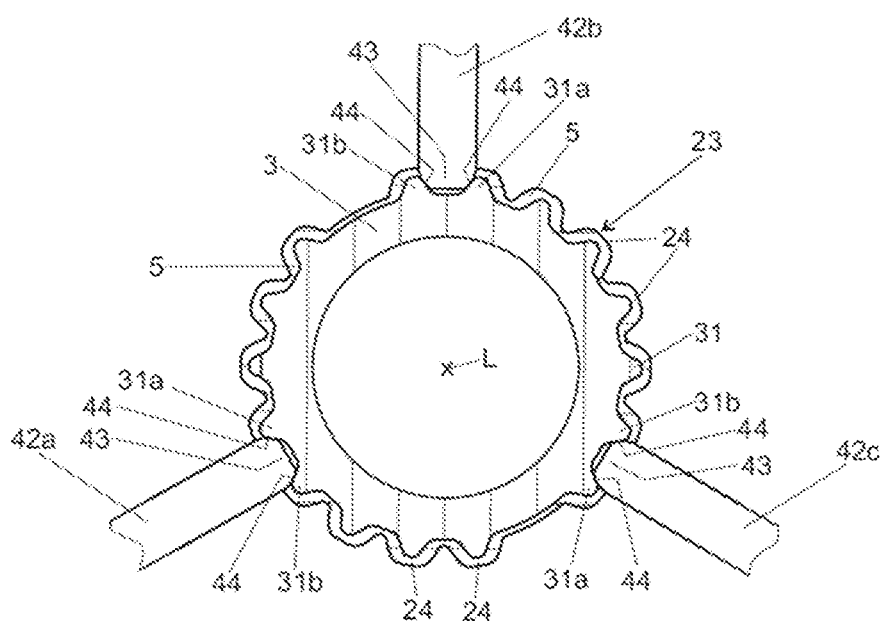
Figure 7
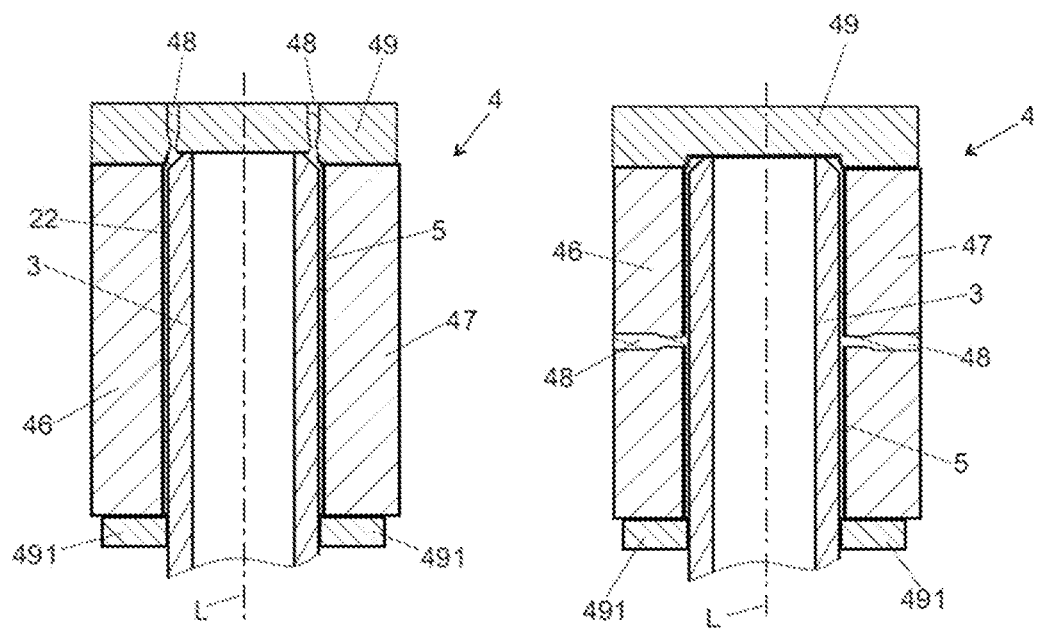
Figure 8
Figure 9

TOOTHED SHAFTS FOR INSTALLATION INTO HOLLOW SHAFTS WITH INTERNAL TOOTHINGS IN TELESCOPIC FASHION

CROSS REFERENCE TO RELATED APPLICATIONS

This application is a U.S. National Stage Entry of International Patent Application Serial Number PCT/EP2017/054621, filed Feb. 28, 2017, which claims priority to German Patent Application No. DE 10 2016 203 627.0, filed Mar. 7, 2016, the entire contents of both of which are incorporated herein by reference.

FIELD

The present disclosure generally relates to steering shafts, including methods for producing variable-length steering shafts.

BACKGROUND

DE 10 2014 105 822 A1 has disclosed a telescopable steering shaft which, in the steering system of a motor vehicle, serves for transmitting the steering torque from the steering wheel to the steering gear. To permit an adjustment of the steering wheel relative to the driver's position in a longitudinal direction, that is to say in the direction of the longitudinal axis, at least one shaft section between the steering wheel and the steering gear is designed to be telescopable and thus adjustable in length. The length-adjustable shaft section may form the driver-side steering spindle or the steering intermediate shaft between the steering spindle and the steering gear.

The steering shaft is of telescopic construction, having a first shaft part which is formed as a hollow shaft and which comprises an internal toothing and which comprises teeth extending in an axial direction, and having a second shaft part which is telescopable relative to said first shaft part and which is formed as a toothed shaft and which comprises an external toothing which, for the transmission of torque, engages in positively locking fashion into said internal toothing and permits a telescopic axial adjustment of the two shaft parts relative to one another.

To minimize the rotational play and improve the sliding characteristics during the telescopic movement, the toothing region of the toothed shaft at least partially has a sliding coating composed of plastic in the contact region with the hollow shaft. Said sliding coating is applied to a shaft core which is composed of metal, generally of steel. By means of the plastic which is softer and more elastic relative to steel, the rotational play is reduced, and friction is reduced. In this way, play-free, precise steering is made possible, and improved sliding characteristics are realized, such that a smooth and uniform longitudinal position of the steering wheel is possible without jerky disruption owing to stick-slip effects. Furthermore, the transmission of vibrations and the generation of noise is advantageously suppressed.

In order that, in mass production with high unit quantities, a consistent optimum function of a steering shaft of said type is ensured, the sliding coating must, throughout the entire production run, be applied to the shaft core with the least possible dimensional deviations between the individual workpieces. In the case a generic process of overmolding with plastic by injection molding, this necessitates correspondingly exact positioning of the shaft core in the injection molding tool. Here, the positioning must be as far as possible exactly coaxial over the entire length of the toothing region, wherein the longitudinal axis of the shaft core of cylindrical basic form corresponds over the axial length of the toothing region to the internally cylindrical form of the mold cavity of the injection mold, that is to say is centered within the mold surfaces, which delimit the toothing, of the mold cavity.

The teeth of the toothed shaft may be formed by core teeth formed on the core shaft, which core teeth are coated in the toothing region with the sliding coating. It is sought here for the sliding coating to comprise, in particular in the region of the tooth flanks, an as far as possible identical layer thickness for all workpieces of a series. For this purpose, it is necessary for the shaft cores to be oriented, with respect to a rotation about the longitudinal axis, with the least possible angular deviation in the injection molding tool.

In the prior art, it is proposed that the shaft core be equipped with fitting surfaces which are arranged outside the toothing region and which, for the positioning, are placed in contact with corresponding counterpart surfaces of the injection molding tool. A disadvantage here is that the formation of the fitting surfaces with the required accuracy necessitates relatively great outlay in terms of manufacture in the provision of the shaft core. Such arrangements are described for example in JP 2013141957A.

Thus a need exists for a method and a device that require relatively low manufacturing outlay to produce a telescopable steering shaft. In particular, for the workpieces of the series manufacturing run, a uniform sliding coating is needed in the toothing region.

SUMMARY

The present disclosure generally concerns methods for producing a variable-length steering shaft. In some examples, the variable-length steering shaft may comprise a hollow shaft with an internal toothing in which a toothed shaft which engages in positively locking fashion is arranged so as to be telescopable in an axial direction, which toothed shaft comprises a toothing region with teeth arranged on the outer circumference and extending in the axial direction, wherein, in the toothing region, a shaft core is, in an injection molding process, overmolded with a sliding coating composed of thermoplastic material. Furthermore, one example method may involve positioning the shaft core within a mold cavity of an injection molding tool coaxially with respect to a mold surface that delimits the toothing region, injecting molten plastic into the mold cavity between the shaft core and the mold surface of the mold cavity by means of at least one injection nozzle, removing the toothed shaft from the injection molding tool after the plastic has solidified, providing the hollow shaft and axially inserting the toothing region into the internal toothing.

In some examples, for the positioning of the shaft core, positioning elements are arranged at least partially in the region of the mold surface of the toothing, which positioning elements, by way of positioning surfaces, lie against the shaft core radially from the outside in the region of the toothing and hold said shaft core coaxially in the mold cavity.

Between the positioning surfaces, which lie against the outer side of the shaft core, of the positioning elements, the shaft core can be centered on the longitudinal axis, and clamped coaxially in an accurately positioned manner, in the mold cavity. In the method according to the invention, positioning elements are, by contrast to the prior art, arranged within the axial extent of the toothing, that is to say in the functional region of the toothing that is overmolded with plastic in the injection molding tool.

In the method according to the invention, it is advantageously the case that surfaces of the toothing in the toothing region, which must in any case be machined in a precise and dimensionally accurate manner in order to ensure optimum telescopability, are at the same time utilized for the positioning of the shaft core in the injection molding tool, specifically for the coaxial, centered clamping in the mold cavity. Thus, the requirement from the prior art to provide the shaft core with additional fitting surfaces is eliminated, whereby the outlay in terms of manufacturing is reduced.

According to the invention, by contrast to the prior art, the support and positioning of the shaft core is realized in the functional region of the toothed shaft, specifically within the axial extent of the toothing region, which in the assembled steering shaft can slide along in the internal toothing of the hollow shaft. In this way, the exact coaxial, centered orientation of the shaft core formed as a core shaft in the mold cavity of the injection molding tool can be ensured without additional machined fitting surfaces, which results in a plastics sliding coating of the teeth which is uniformly thick over the circumference with high accuracy in a radial direction. Detrimental tolerances which can arise in the prior art in the positioning between fitting surfaces formed spatially separately from the toothing, and which lead to an axially offset arrangement of the shaft core formed as a core shaft in the mold cavity and can adversely affect the uniformity of the sliding coating, cannot occur out of principle according to the invention. The tolerance chain is, in relation to the prior art, particularly short, because the positioning is realized directly by means of the functional region that is to be overmolded. In this way, greater dimensional accuracy and quality of the sliding coating are achieved.

The toothed shaft may be formed as a solid shaft or as a hollow shaft. The shaft core may preferably be formed from a metallic material, for example steel or an aluminum alloy.

The invention is based on the unexpected realization that, the positioning surfaces, which during the clamping according to the invention of the shaft core by means of the positioning elements lie within the toothing region, do not give rise to any disadvantages in relation to the prior art, which provides clamping between fitting surfaces outside the toothing region. The opinion that prevails in the prior art, that no clamping should be realized within the functional surfaces of the toothing, is overcome according to the invention. The abovementioned advantages prevail.

In its basic form, the shaft core may preferably be of cylindrical form, that is to say formed as a cylindrical shaft. It is preferable here for the shaft core to comprise core teeth which project radially outward from the cylindrical region and which are preferably arranged in the region of the teeth of the toothing region. Here, the core teeth are situated substantially within the cross section of the teeth of the toothing region and thus form tooth main bodies which, to form the teeth, are at least partially overmolded or coated with plastic. This results in high dimensional stability and load capacity of the toothing. Furthermore, in this way, greater operational reliability is achieved in that the core teeth can drive the hollow shaft in positively locking fashion even if the plastic has become worn or removed. Alternatively, the teeth may also be composed entirely of plastic by being molded onto the shaft core in a cylindrical region without core teeth. In this way, greater elasticity and optimized sliding characteristics can be achieved, in particular even if teeth with and without core teeth are combined within one toothing.

An advantageous refinement of the method according to the invention provides for at least one of the positioning elements to comprise positioning surfaces which, in a circumferential direction, engage in positively locking fashion between the flanks of core teeth which are adjacent in a circumferential direction. It is correspondingly the case here that, when the core shaft is clamped in the injection molding tool, the positioning surfaces lie without play against the flanks, situated opposite one another in the circumferential direction, of core teeth which are situated adjacent to one another in the circumferential direction. Here, by means of the positioning elements, the shaft core is fixed in a defined angular orientation with respect to a rotation about the longitudinal axis of the toothed shaft, which is identical to the longitudinal axis of the core shaft or of the mold cavity.

The positioning element(s) may in this case ensure that the flanks of each core tooth comprise the same spacing to the corresponding mold surface of the injection molding tool, whereby the sliding coating comprises a dimensionally accurate, consistent wall thickness over all teeth of the workpieces of the series manufacturing run.

The overmolding preferably comprises a uniform wall thickness. By means of the positioning elements formed according to the invention, it is possible to realize a particularly constant wall thickness of the overmolding, aside from the impressions of the positioning elements, because the shaft core is, owing to the positioning elements according to the invention, oriented with very high precision relative to the mold surface.

The overmolding may likewise comprise different wall thicknesses. This may be the case for example in order to form a tooth formed purely from the overmolding, that is to say said tooth is formed only by the overmolding and comprises no core tooth. In other words, said tooth formed purely from the overmolding lacks a core tooth.

In addition or alternatively, provision may be made whereby, by means of different wall thicknesses, two load-bearing regions are formed, wherein said regions are spaced apart from one another axially, that is to say in the direction of the longitudinal axis, and comprise a greater wall thickness than the overmolding outside said regions. Thus, a defined transmission of torque between hollow shaft and toothed shaft can be realized, because defined contact regions are formed between the hollow shaft and the toothed shaft. In addition or alternatively, provision may be made whereby, by means of different wall thicknesses, lubricating pockets are formed in the overmolding. By means of the positioning elements according to the invention, the overmolding formed by the mold surface is oriented very precisely with respect to the core shaft.

The positioning elements formed according to the invention consequently comprise a dual function, specifically coaxially centering the shaft core formed as core shaft in the injection molding tool and simultaneously ensuring an exact angular orientation with respect to the longitudinal axis. The shaft core is thus uniquely oriented and fixed within the mold cavity. By means of this additional positioning function, an additional simplification in relation to the prior art is realized, because the separate fitting surfaces required therein for the angular orientation are, according to the invention, likewise replaced by the dimensionally accurately machined flanks of the existing core teeth. As described above for the coaxial centering, an improvement in dimensional accuracy is likewise achieved here.

The positioning elements may be formed as positioning pins which project radially inwardly into the mold cavity. The positioning pins may for example comprise a square, rectangular, polygonal or circular cross section which, measured in an axial direction of the toothed shaft, is narrower than the toothing region. The dimension in the circumferential direction may preferably correspond, in terms of order of magnitude, to the spacing between two adjacent teeth. From the inner mold surface that delimits the toothing, the positioning pins project in each case with a free end radially inward into the mold cavity. At least one positioning surface is formed in the region of the free end and may, with regard to its form and dimensions, be adapted to that region of the mold core against which said positioning surface lies for the purposes of the positioning during the coaxial clamping of the shaft core.

Unique coaxial centering may be realized by virtue of at least three, preferably exactly three, positioning elements being arranged so as to be distributed over the circumference. Provision may be made for the three positioning elements to be offset with respect to one another in the direction of the longitudinal axis, or to be arranged in one radial plane. The positioning elements are preferably arranged so as to be distributed uniformly over the circumference, that is to say at angular intervals of 180°. By virtue of the fact that the positioning elements project radially inward into the mold cavity at equal angular intervals, a shaft core received in the injection mold can be clamped in a reliably and accurately centered manner in the mold cavity between the free ends, as in the case of a clamping chuck, for example a three-jaw chuck.

Provision may preferably be made for multiple positioning elements to be arranged parallel to a radial plane of the mold cavity. The radial plane is perpendicular to the common longitudinal axis of shaft core and toothed shaft. In this way, the shaft core is clamped in a centered manner by the positioning elements in the region where the radial plane intersects the longitudinal axis. To implement the method according to the invention, the radial plane may be situated within the toothing region.

A refinement of the abovementioned positioning provides for a first group of positioning elements to be arranged parallel to a first radial plane of the mold cavity, and for at least one second group of positioning elements to be arranged parallel to a second radial plane axially spaced apart from the first radial plane. The first radial plane and the second radial plane intersect the longitudinal axis, as described, in each case at a first and at a second intersection point, also referred to as penetration point. Correspondingly, the shaft core is clamped in a centered manner in the first and in the second radial plane. Consequently, the toothing region is, between the intersection points, oriented exactly coaxially in the mold cavity.

Provision may be made for at least one positioning element to be arranged axially spaced apart from the toothing region. Aside from a positioning element situated, according to the invention, within the toothing region, it is also possible for the support and clamping of the shaft core to be realized with a greater axial spacing by means of a positioning element arranged outside the toothing region. By means of the greater clamping length, the exact coaxial orientation can be simplified.

The invention encompasses an injection molding device for carrying out the method according to the invention, comprising an injection molding tool with a mold cavity which extends along a longitudinal axis and which comprises a toothing region with mold surfaces which, over a section of the longitudinal axis, delimit a coaxial toothing, wherein positioning elements for the coaxial positioning of a shaft core are arranged in the mold cavity.

Injection molding devices for producing toothed shafts overmolded with plastic according to the prior art described in the introduction are known in principle. Said injection molding devices comprise positioning elements in the mold cavity, which positioning elements permit the coaxial clamping of a shaft core. In a partial region of its longitudinal extent, the mold cavity comprises a toothing region with mold surfaces for the overmolding of the shaft core with a coaxial toothing. In the case of the known injection molding devices, the positioning elements are arranged such that, by means of their positioning surfaces, they clamp the shaft core between fitting surfaces formed outside the toothing region.

The formation of the fitting surfaces on the shaft core necessitates additional manufacturing outlay. Furthermore, tolerances may arise between the fitting surfaces and the toothing region, which tolerances impair the dimensional accuracy of the plastics coating.

To solve this problem, at least one positioning element is arranged within the toothing region.

By means of this embodiment of the injection molding device, it is possible for the shaft core to be positioned and clamped in a positionally accurate manner within the toothing in the mold cavity. Further advantages and features have been described above for the method according to the invention which can be realized using the injection molding device according to the invention in order to carry out the method according to the invention.

A refinement of the injection molding device provides for at least one positioning element to be arranged on a slide which is movable radially relative to the mold cavity.

For the positioning and clamping the shaft core can be centered and coaxially clamped by means of radially inwardly directed movement of the slide between the positioning elements. At least one positioning surface is formed on a positioning element in the region of the free end thereof, which free end is movable against the shaft core from the outside. The positioning surface is, for the positioning and clamping, placed in contact with the shaft core in the toothing region in accordance with the invention. This yields the advantages described above.

According to the invention, provision is also made of a toothed shaft for installation into a hollow shaft with an internal toothing in which the toothed shaft can be received, and coupled in positively locking fashion to said toothed shaft, so as to be telescopable in the direction of the longitudinal axis, wherein the toothed shaft comprises a toothing region with teeth arranged on the outer circumference and extending in the axial direction, wherein, in the toothing region, a shaft core is, in an injection molding process, overmolded with a sliding coating composed of thermoplastic material. According to the invention, it is proposed as a solution that the sliding coating comprises at least three impressions.

The impressions according to the invention are the result of the above-described positioning elements which position the shaft core in the injection molding tool. The impressions, which are formed in the sliding coating by the positioning elements can offer the possibility of accommodating a reserve of optionally provided lubricant. It is thus possible in a simple manner for a lubricant retention volume, also referred to as lubricating pocket, to be realized without additional measures.

The sliding coating preferably comprises exactly three impressions or exactly six impressions.

Provision may preferably be made for the sliding coating to comprise six impressions, wherein three impressions are arranged in a first radial plane and the other three impressions are arranged in a second radial plane, wherein the first radial plane comprises a spacing to the second radial plane in the direction of the longitudinal axis.

The first radial plane and the second radial plane intersect the longitudinal axis, as described, in each case at a first and that a second intersection point, also referred to as penetration point. By means of the clamping of the shaft core by means of the positioning elements in the first and in the second radial plane, the shaft core is, as already stated, oriented for the overmolding in the injection mold. After the overmolding of the shaft core, the positioning elements lying against the shaft core form the impressions according to the invention in the sliding coating.

The impressions preferably comprise an aperture through the sliding coating to the surface of the shaft core.

In an advantageous refinement, the aperture is formed in the region of a tooth flank of the adjacent core tooth of the shaft core.

It is advantageous if the shaft core is formed from a metallic material; the shaft core is particularly preferably formed from steel or from an aluminum alloy.

BRIEF DESCRIPTION OF THE FIGURES

FIG. 7 is an enlarged cross-sectional view of the example toothed shaft as per FIG. 6 clamped in an injection molding tool.

FIG. 8 is a longitudinal sectional view along a longitudinal axis through an example injection molding tool.

FIG. 9 is a longitudinal sectional view along a longitudinal axis as in FIG. 8 through another example injection molding tool.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or can' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 1:
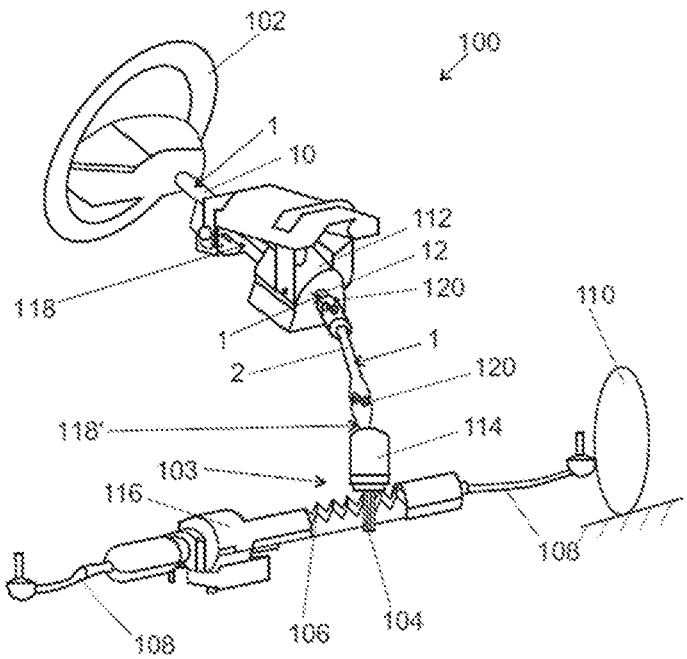
FIG. 1 is a perspective view of an example motor vehicle steering system.

FIG. 1 schematically illustrates a motor vehicle steering system 100, wherein a driver can use a steering wheel 102 to input a corresponding steering torque (steering moment) as a steering command into a steering shaft 1. The steering moment is transmitted via the steering shaft 1 to a steering pinion 104, which meshes with a toothed rack 106, which then in turn, by means of a displacement of the track rods 108, transmits the predefined steering angle to the steerable wheels 110 of the motor vehicle.

An electric power assistance means may be provided in the form of a power assistance means 112 coupled at the input side to the steering shaft 1, of a power assistance means 114 coupled to the pinion 104, and/or of a power assistance means 116 coupled to the toothed rack 106. The respective power assistance means 112, 114 or 116 couples an auxiliary torque into the steering shaft 1 and/or the steering pinion 104 and/or couples an auxiliary force into the toothed rack 106, whereby the driver is assisted in performing steering work. The three different assistance means 112, 114 and 116 illustrated in FIG. 1 show possible positions for the arrangement thereof.

Normally, only a single one of the illustrated positions is occupied with a power assistance means 112, 114 or 116. The auxiliary torque or the auxiliary force that is to be imported in order to assist the driver by means of the respective power assistance means 112, 114 or 116 is determined taking into consideration a steering moment input by the driver and ascertained by a torque sensor 118. Alternatively or in combination with the introduction of the auxiliary torque, the power assistance means 112, 114, 116 may introduce an additional steering angle into the steering system, which is added to the steering angle imparted by the driver by means of the steering wheel 102.

The steering shaft 1 comprises, at the input side, an input shaft 10 connected to the steering wheel 102 and, at the output side, output shaft 12 connected to the toothed rack 106 via the steering pinion 104. The input shaft 10 and the output shaft 12 are coupled to one another in a rotationally elastic manner by means of a torsion bar (not shown in FIG. 1). Thus, a torque input into the steering shaft 10 by a driver using the steering wheel 102 always leads to a relative rotation of the input shaft 10 with respect to the output shaft 12, if the output shaft 12 does not rotate exactly synchronously with respect to the input shaft 10. Said relative rotation between input shaft 10 and output shaft 12 can be measured by means of a rotational angle sensor and, correspondingly, on the basis of the known torsional stiffness of the torsion bar, a corresponding input torque relative to the output shaft 12 can be determined. In this way, the torque sensor 118 is formed by means of the determination of the relative rotation between input shaft 10 and output shaft 12. A torque sensor 118 of said type is known in principle and may for example be realized by means of an electromagnetic sensor arrangement, as will be described further below, or by means of some other measurement of the relative rotation.

Correspondingly, a steering moment that is imparted by the driver to the steering shaft 1 or to the input shaft 10 using the steering wheel 102 will effect an introduction of an auxiliary torque by one of the power steering assistance means 112, 114, 116 only if the output shaft 12 is rotated relative to the input shaft 10 counter to the torsional resistance of the torsion bar.

The torque sensor 118 may also alternatively be arranged at the position 118', wherein then, the division of the steering shaft 1 into the input shaft 10 and output shaft 12, and the rotationally elastic coupling by means of the torsion bar, are correspondingly present at a different position, in order to be able, from the relative rotation of the output shaft 12 coupled to the input shaft 10 via the torsion bar, to determine a relative rotation and thus correspondingly an input torque and/or an auxiliary torque to be introduced.

The steering shaft 1 as per FIG. 1 furthermore comprises at least one cardanic joint 120 by means of which the profile of the steering shaft 1 in the motor vehicle can be adapted to the spatial conditions. The steering intermediate shaft of the steering shaft 1, which in the example illustrated is arranged between two cardanic joints 120 and connects the output shaft 12 to the pinion 104 of the steering gear 103, is designed according to the invention as a variable-length steering shaft 2.

Figure 2:
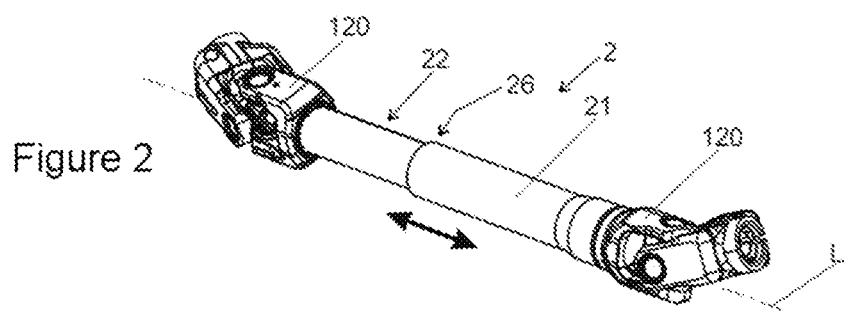
FIG. 2 is a perspective view of an example steering shaft.
Figure 3:
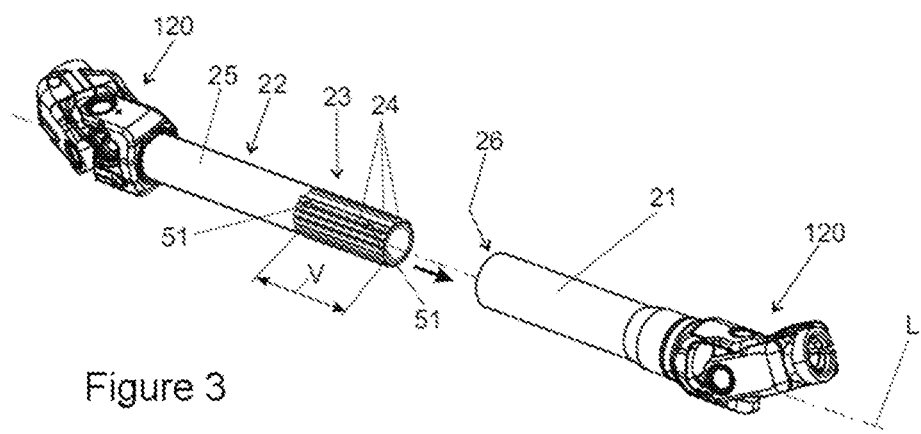
FIG. 3 is a perspective view of the example steering shaft of FIG. 2 that has been axially pulled apart.

FIG. 2 and FIG. 3 show the steering shaft 2 in the assembled state (FIG. 2) and in a state in which they have been pulled apart in the axial direction (FIG. 3).

The steering shaft 2 comprises a hollow shaft 21 and a toothed shaft 22. The toothed shaft 22 comprises a toothing region 23 with a multiplicity of teeth 24 arranged on the outer circumference, which teeth extend in the direction of the longitudinal axis L, that is to say axially over the length V of the toothing region 23.

Figure 3A:
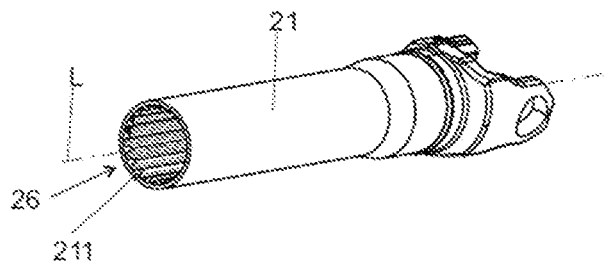
FIG. 3a is a perspective view of the example hollow shaft of FIG. 3.

It can be seen from FIG. 3a that the hollow shaft 21 comprises a receiving opening 26 which is open toward the toothed shaft 22 and which comprises an internal toothing 211 in which the toothing region 23 can be received in positively locking fashion. To produce a connection fixed in terms of torque, the toothed shaft 22 is, proceeding from the situation illustrated in FIG. 3, inserted in an axial direction, as indicated by the arrow, in the direction of the longitudinal axis L into the receiving opening 26 of the hollow shaft 21, such that the assembled state illustrated in FIG. 2 is realized. In this assembled state, the toothed shaft 22 and the hollow shaft 21 can move relative to one another along the longitudinal axis L for the purposes of compensating spacing differences, as indicated by the double arrow.

It can be seen from FIG. 3 that the toothed shaft 22 comprises a cylindrical shank 25 outside the toothing region 23, wherein, in the example illustrated, the length V of the toothing region 23 corresponds to only a part of the total length of the toothed shaft 22.

Figure 4:
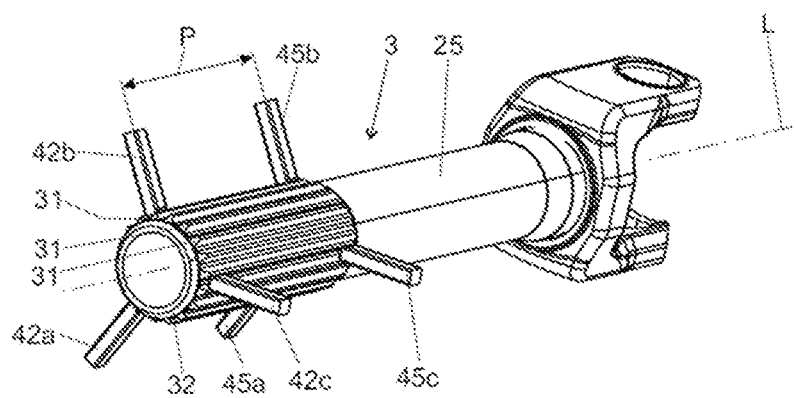
FIG. 4 is a perspective view of an example toothed shaft of a steering shaft as per FIG. 2 with positioning elements, prior to an overmolding with plastic.

FIG. 4 shows a toothed shaft 22 in the partially fabricated state prior to the overmolding. Said toothed shaft is formed by a shaft core 3 which are composed preferably of metal, preferably steel. In the toothing region 23 of the finished toothed shaft 22 as per FIG. 5, the shaft core 3 comprises core teeth 31 which are arranged in the region of the teeth 24 of the finished toothing region 23, such that said core teeth constitute the main body is composed of steel, which main bodies are overmolded with plastic to form the finished teeth 24. The length of the core teeth 31 in the direction of the longitudinal axis L corresponds substantially to the length V of the fully overmolded teeth 24, specifically minus the wall thickness of a possible end-side, that is to say axial, overmolding of the core teeth 31.

Figure 5:
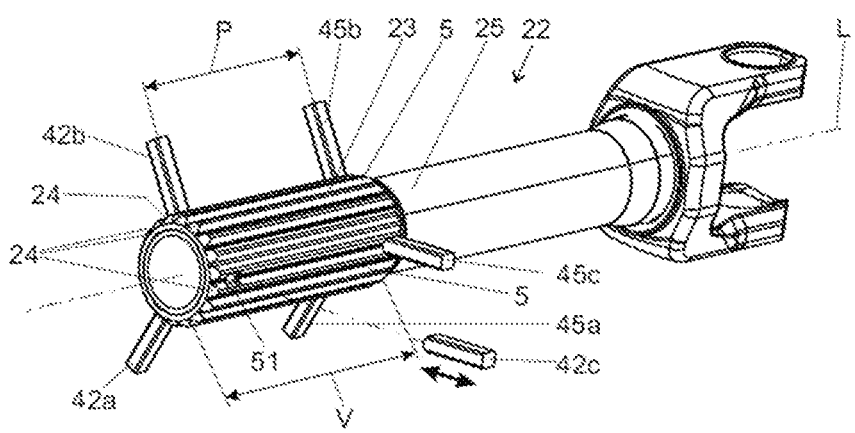
FIG. 5 is a perspective view of an example toothed shaft of a steering shaft as per FIG. 2 with positioning elements, after an overmolding with plastic.

It can be seen from FIGS. 4 and 5 that the longitudinal axis L of the toothed shaft 22 and of the shaft core 3 is identical.

Figure 6:
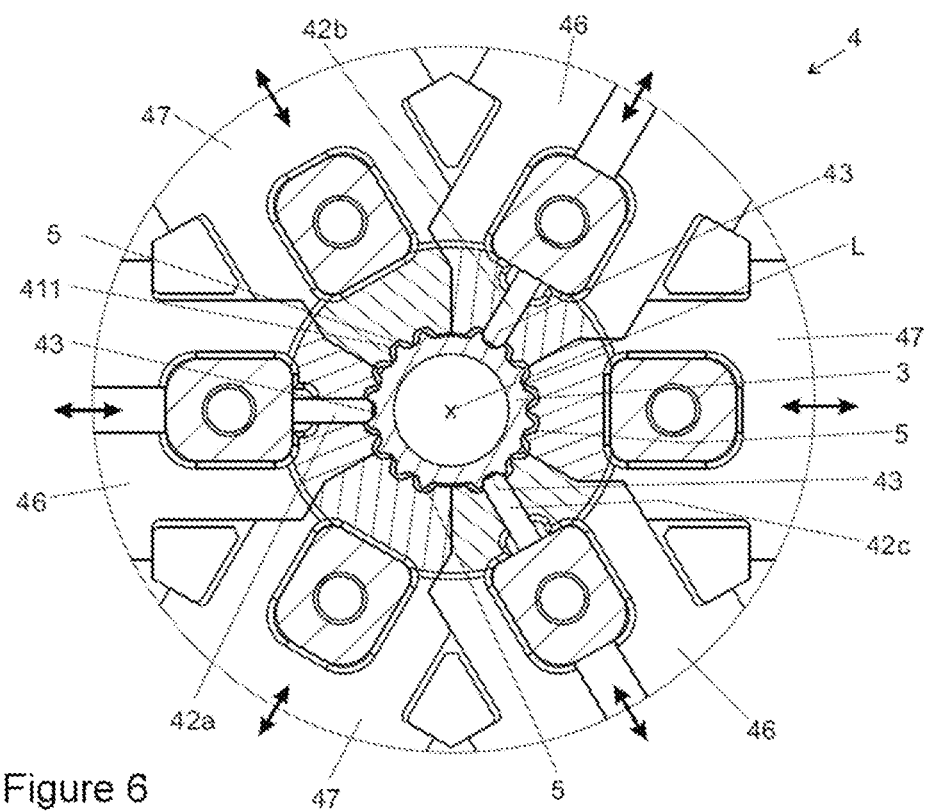
FIG. 6 is a cross-sectional view through an example injection molding tool with a toothed shaft clamped therein, after injection of plastic.

FIG. 6 shows a cross section perpendicular to the longitudinal axis L through an injection mold 4 for carrying out the method according to the invention. In particular, it can be seen in this illustration how the shaft core 3 is clamped in a centered manner, that is to say concentrically with respect to the longitudinal axis L, between positioning elements 42a, 42b and 42c. The arrangement of the positioning elements 42a, 42b and 42c is also schematically shown in FIG. 4 and FIG. 5, wherein the rest of the injection mold 4 has been omitted for the sake of better clarity.

Figure 6A:
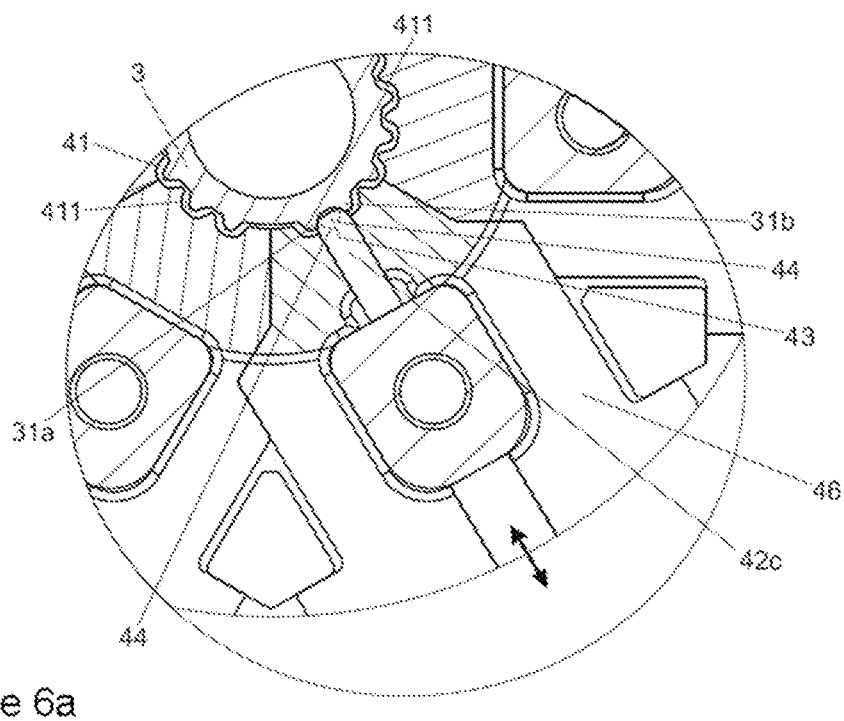
FIG. 6a is a detailed cross-sectional view through an example injection molding tool similar to that shown in FIG. 6 with a toothed shaft clamped therein, prior to injection of plastic.

The positioning elements 42a, 42b and 42c are of pin-like form, with, in the illustrated example, a rectangular or square cross section, the dimension of which in the direction of the longitudinal axis L amounts to only a fraction of the length V of the toothing region 23. It is likewise conceivable and possible for the positioning elements to comprise a circular cylindrical cross section. In the example shown, the three positioning elements 42a, 42b and 42c are arranged so as to be distributed uniformly over the circumference and are, with their free ends 43, directed radially inward toward the longitudinal axis L, such that the shaft core 3 is clamped coaxially in centered fashion relative to the longitudinal axis L in a mold cavity 41 between the free ends 43. In the injection mold 4, the shaft core 3 is surrounded in the toothing region 23 by the mold surface 411 that delimits the teeth 24, that is to say said mold surface 411 forms the negative impression of the toothing region 23. The mold surface 411 is likewise oriented coaxially with respect to the longitudinal axis L. The mold surface 411 and the mold cavity 41 can be seen particularly clearly in FIG. 6a, which illustrates a detail view of the cross section of the injection molding tool illustrated in FIG. 6 with a toothed shaft clamped therein, prior to the injection of the plastic.

An enlarged cross-sectional view of the toothed shaft clamped in the injection molding tool as per FIG. 6 is illustrated in detail in FIG. 7. The positioning elements 42a, 42b and 42c comprise positioning surfaces 43 in the region of their free ends 43. The positioning surfaces 44 are arranged such that they come into contact with the tooth flanks, facing toward one another in the circumferential direction, of adjacent core teeth 31a and 31b. In this way, the positioning elements 42a, 42b and 42c can, by way of the positioning surfaces 44, engage in each case in positively locking fashion between adjacent core teeth 31a and 31b from the outside. In this way, the shaft core 3 is, by means of the positioning elements 42a, 42b and 42c, clamped so as to be accurately angularly oriented with respect to a rotation about the longitudinal axis L within the mold cavity 41 and in a centered manner.

The positioning elements 42a, 42b and 42c are arranged in a first radial plane, specifically in the cross-sectional plane shown in FIG. 6. As can be seen from FIG. 4 and FIG. 5, second positioning elements 45a, 45b and 45c, which are in principle of identical design, are arranged in a second radial plane which comprises a spacing P (see FIG. 4) to the first radial plane in the direction of the longitudinal axis L. For the example shown, it is the case that P is smaller than V, such that all of the positioning elements 45a, 45b, 45c, 42a, 42b and 42c are arranged within the toothing region 23. In this way, the shaft core 3 is, at the intersection points of the first and of the second radial plane, centered exactly on the longitudinal axis L, and is, at the spacing P, oriented correspondingly exactly concentrically in the mold cavity 41.

To be able to clamp the shaft core 3 within the mold cavity 41, the positioning elements 42a, 42b and 42c are in each case attached to a slide 46 which is of segmented form and which is movable radially relative to the longitudinal axis L, as indicated in FIG. 6 by the double arrows. It is preferable for in each case two positioning elements 42a and 45a, 42b and 45b and also 42c and 45c arranged in the same circumferential position to be fastened in each case to one slide 46.

Arranged between the slides 46 in a circumferential direction are slides 47, which are likewise of segmented form and which, for the purposes of demolding, can be moved apart from one another, radially with respect to the longitudinal axis L, together with the slides 46, without colliding.

If the slides 46 and 47 are moved radially apart from one another, a shaft core 3 can be introduced into the injection mold 4. Subsequently, the slides 46 and 47 are moved together in a radially inward direction, wherein the shaft core 3 is, as described above, clamped in a centered and angularly oriented manner in the mold cavity 41 between the positioning surfaces 44 of the positioning elements 45a, 45b, 45c, 42a, 42b and 42c. At the same time, as a result of the slides 46 and 47 being moved together, the injection mold 4 is closed, wherein the mold surface 411 is closed in a circumferential direction.

When the injection mold 4 is closed, molten plastic is injected into the mold cavity 41 between the mold surface 411 and the outer circumference of the shaft core 3 in the toothing region 23. This mold cavity 41, which can be clearly seen in FIG. 6a, defines the dimensions and thus the wall thickness of the plastics overmolding that is still to be introduced, and which forms the sliding coating. The plastics overmolding thus equates to the sliding coating.

The injection of the molten plastic into the injection mold 4 may be performed via axial injection nozzles, arranged at the end side on the mold cavity 41, at the gate points 48, as is schematically illustrated in FIG. 8. The gate points 48 are situated in an end wall 49 of the injection mold 4, which end wall is situated opposite the free end of the core shaft 3. For the purposes of demolding, said end wall 49 can be moved away from the core shaft 3 in an axial direction.

Alternatively, the gate points 48 may be arranged radially, as shown in FIG. 9.

After the cooling and solidification of the plastics overmolding 5, the slides 46 and 47 are, for the purposes of demolding, moved radially apart from one another in stellate fashion, such that the fully overmolded toothed shaft 22 can be removed from the injection mold 4. This is demonstrated in FIG. 5 by way of example on the basis of the positioning element 42c that has been moved away in a radially outward direction. In said figure, it can likewise be seen that the positioning element 42c has, by means of the positioning surfaces 44 lying against the shaft core 3 during the overmolding process, left behind an impression 51 in the plastics overmolding 5 within the toothing region 23. Contrary to the widespread opinion in the prior art, this is not critical for the functioning of the variable-length steering shaft 2, such that the advantages of the method according to the invention can be utilized with regard to more economic manufacture and a more exact plastics overmolding 5 without limitations.

Figure 10:
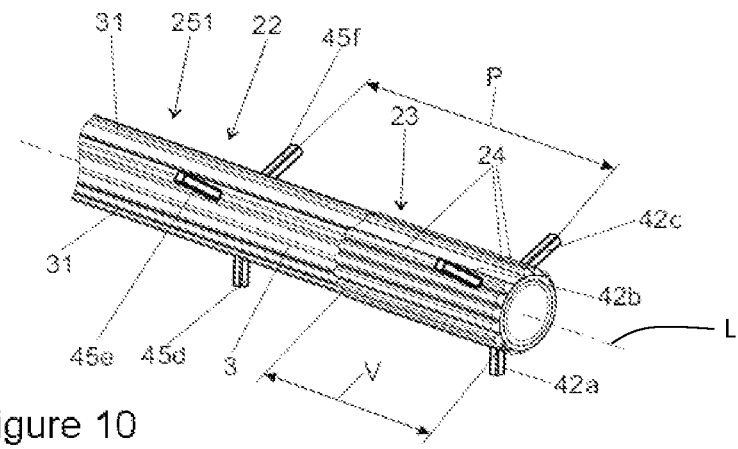
FIG. 10 is a perspective view of an example toothed shaft of another example steering shaft with positioning elements, after overmolding with plastic.

FIG. 10 illustrates a toothed shaft 22 of a steering shaft 1 with positioning elements (42a, 42b, 42c, 45d, 45f, 45g), after the overmolding with plastic, in an alternative embodiment. The toothed shaft 22 comprises a core-toothed shaft 251 outside the toothing region 23. The positioning elements 42a, 42b and 42c are arranged in a first radial plane. The second positioning elements 45a, 45b and 45c, which are in principle of identical design, are arranged in a second radial plane which comprises a spacing P to the first radial plane in the direction of the longitudinal axis L. For the exemplary embodiment shown, it is the case that P is greater than V, such that only the positioning elements 42a, 42b and 42c are arranged within the toothing region 23. The positioning elements 45d, 45e and 45f are arranged outside the toothing region 23. The shaft core 3 comprises the core teeth 31, which extend over the entire shank 251, beyond the toothing region 23 in the direction of the longitudinal axis L. The shaft core 3 is preferably formed as a drawn profile or extruded profile. An advantage of this embodiment is that the first and second radial plane are at a great distance from one another, such that an oblique positioning of the clamped toothed shaft 22 is minimized, because a radial offset of the positioning elements in one radial plane in relation to the ideal state has little influence on the oblique positioning, because the supporting length is relatively large.

Figure 11:
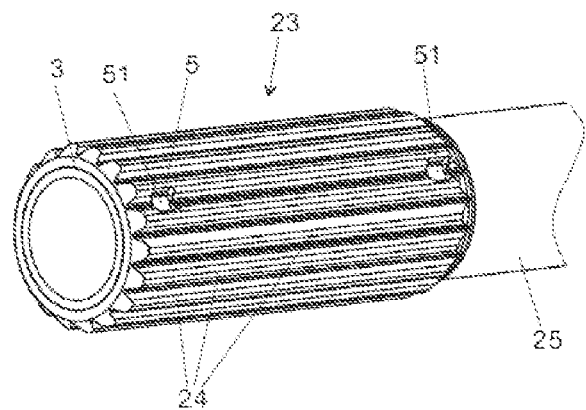
FIG. 11 is a perspective view of an example toothed shaft of a steering shaft as per FIG. 5 without positioning elements, after overmolding with plastic.

FIG. 11 illustrates the toothed shaft 22 as per FIG. 4 without positioning elements, after the overmolding with plastic. The positioning elements 42a, 42b and 42c and 45a, 45b and 45c have, by means of the positioning surfaces 44 lying against the shaft core 3 during the overmolding process, left behind the impressions 51 in the plastics overmolding 5 within the toothing region 23. The impressions 51 have formed as a result of the injected plastic flowing around the positioning elements 42a, 42b, 42c, 45a, 45b and 45c, and the positioning elements 42a, 42b, 42c, 45a, 45b and 45c having been removed only after the solidification of the liquid plastic. The impressions 51 are depressions in the plastics overmolding 5, which comprise an aperture 511 through the plastics overmolding 5 to the surface of the core shaft 3. The aperture is formed in the region of the tooth flanks 311a, 311b of the adjacent core teeth 31a, 31b. As a result of the contact between the respective positioning surface 44 of the positioning element 42a, 42b, 42c, 45a, 45b, 45c and the respective tooth flank 311a, 311b of the adjacent core tooth 31a, 31b during the overmolding, said contact surface is not coated with the plastic. At this point, at which no overmolding can form owing to the contact between the positioning surface 44 and the tooth flank 311a, 311b, the aperture 511 is formed in the sliding coating 5.

Figure 12:
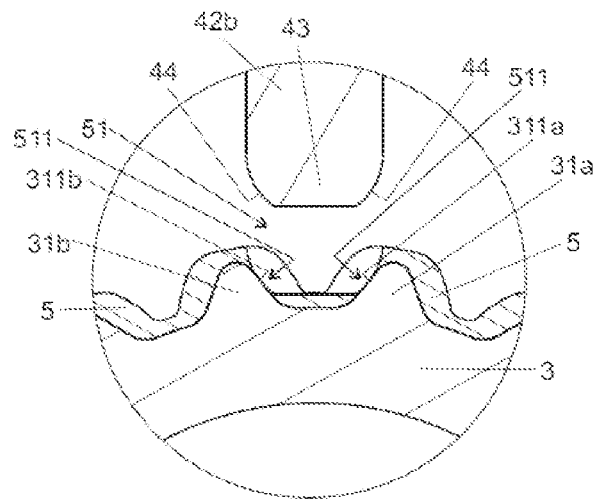
FIG. 12 is an enlarged cross-sectional detail view as per FIG. 7 with an example retracted positioning element.

The aperture 511 can be seen particularly clearly in FIG. 12. FIG. 12 shows an enlarged detail view of the cross section as per FIG. 7 with a retracted positioning element 42b. The impression 51 constitutes a negative impression in the sliding coating 5 of the free end 43 of the positioning element 42b. The impression 51 is a depression in the sliding coating 5, which depression comprises an aperture 511 in the region of the tooth flanks 311a, 311b, because no sliding coating 5 is formed in this region. In other words, the outer surface of the core shaft 3 is not coated in the region of the contact between the positioning element and the tooth flanks 311a, 311b. At this point, the aperture 511 is formed such that the surface of the core shaft 3 is visible through the aperture 511 in the impression 51.

Figure 13:
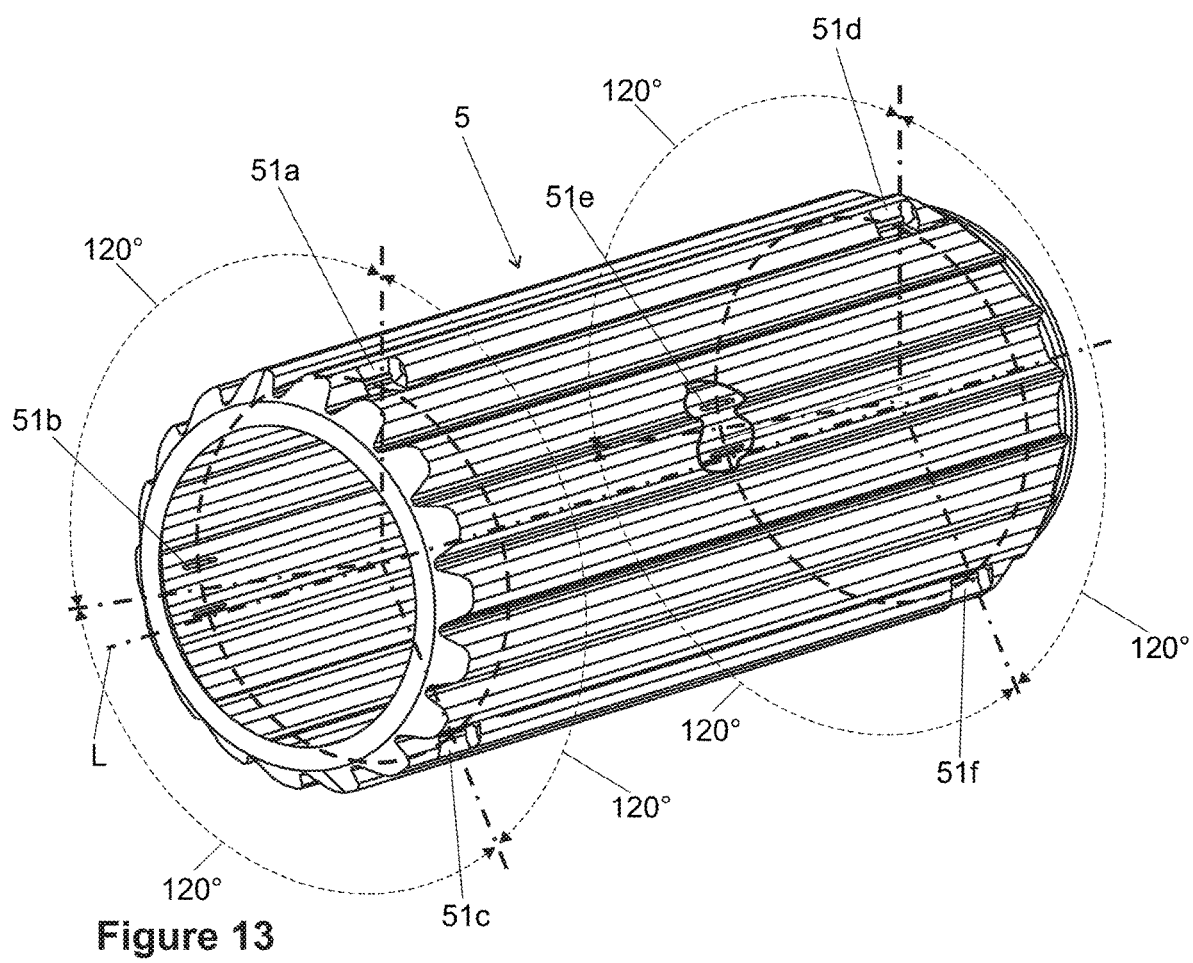
FIG. 13 is a perspective view of an example sliding coating with six example impressions.

FIG. 13 shows the sliding coating 5 with six impressions 51a, 51b, 51c, 51d, 51e, 51f. The three impressions 51a, 51b, 51c are disposed uniformly over a circumference of the sliding coating 5 of the toothed shaft at a first longitudinal location, as are the three impressions 51d, 51e, 51f at a second longitudinal location. One having ordinary skill in the art would recognize that three of the impressions 51a, 51b, 51c are disposed in a first radial plane that is spaced apart from a second radial plane in which three more of the impressions 51d, 51e, 51f are disposed.

Figure 14:
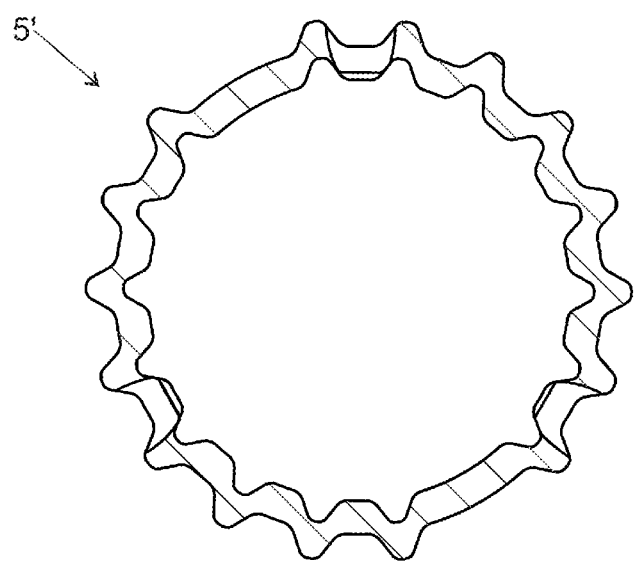
FIG. 14 is a cross-sectional view of an example sliding coating that has a uniform wall thickness, at least aside from three impressions.

FIG. 14 shows another example sliding coating 5' that has a uniform wall thickness, at least aside from three impressions.

Figure 15:
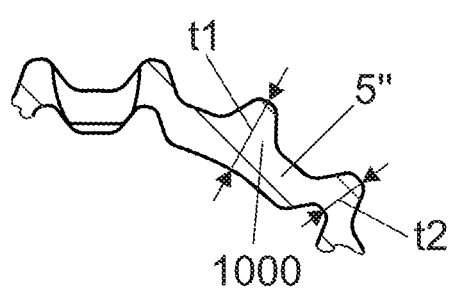
FIG. 15 is a cross-sectional view of part of an example sliding coating that has different wall thicknesses.

FIG. 15 shows an example sliding coating 5" that has different wall thicknesses. In particular, the example sliding coating 5" has a greater wall thickness t1 at a first location than a lesser wall thickness t2 at a second location of the sliding coating 5". Unlike at the location of the greater wall thickness t1, the sliding coating 5" does not include a tooth formed completely by the sliding coating 5" at the location corresponding to the lesser wall thickness t2.

Figure 16:
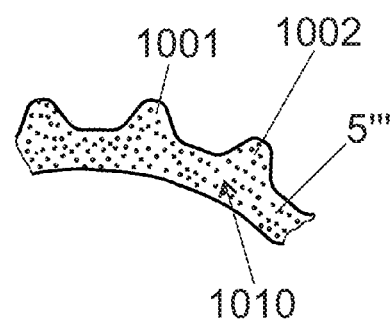
FIG. 16 is a cross-sectional view of part of an example sliding coating where all of the teeth of a toothed shaft are formed entirely by the sliding coating.

FIG. 16 depicts an example wherein all of the teeth 1001, 1002 of a toothed shaft are formed entirely by the sliding coating 5'''. In the example of FIG. 16, the sliding coating 5''' comprises exclusively thermoplastic material 1010.

Figure 17:
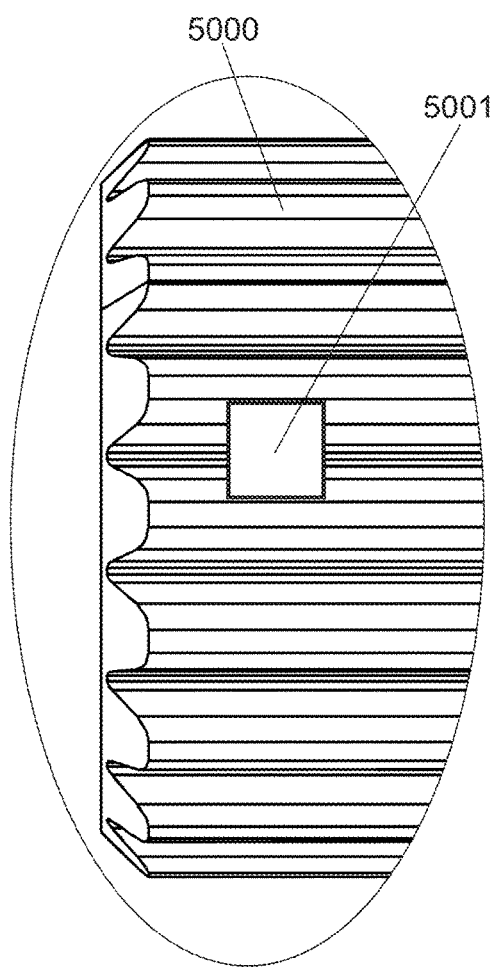
FIG. 17 is a side view of an example sliding coating with an impression with a square cross section.
Figure 18:
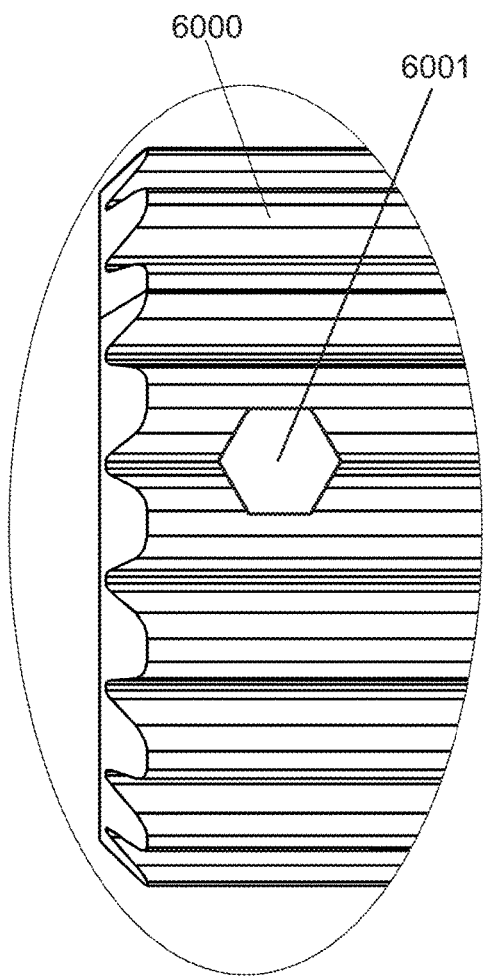
FIG. 18 is a side view of an example sliding coating with an impression with a polygonal cross section.

FIG. 17 shows an example sliding coating 5000 having an impression 5001 with a square cross section. FIG. 18 shows another example sliding coating 6000 having an impression 6001 with a polygonal cross section.

LIST OF REFERENCE DESIGNATIONS

1 Steering shaft
10 Input shaft
12 Output shaft
100 Motor vehicle steering system
102 Steering wheel
103 Steering gear
104 Steering pinion
106 Toothed rack
108 Track rod
110 Steerable wheel
112 Power assistance means
114 Power assistance means
116 Power assistance means
118 Torque sensor
118' Torque sensor
120 Joint
2 Variable-length steering shaft
21 Hollow shaft
22 Toothed shaft
23 Toothing region
24 Tooth
25, 251 Shank
26 Receiving opening
3 Shaft core
31 Core tooth
31a,b Adjacent core tooth
311 Tooth flank
4 Injection mold
41 Mold cavity
411 Mold surface
42a,b,c Positioning element
43 Free end
44 Positioning surface
45a,b,c Positioning element
45d,e,f Positioning element
46, 47 Slide
48 Gate point
49 End wall
491 End wall
5 Plastics overmolding (or "sliding coating")
51 Impression
511 Aperture
L Longitudinal axis
V Length of toothing region
R Radius
5' Plastics overmolding (or "sliding coating")
5" Plastics overmolding (or "sliding coating")
t1 Greater wall thickness
t2 Lesser wall thickness
5''' Plastics overmolding (or "sliding coating")
1001 Tooth
1002 Tooth
1010 Thermoplastic material
5000 Plastics overmolding (or "sliding coating")
5001 Aperture
6000 Plastics overmolding (or "sliding coating")
6001 Aperture

What is claimed is:

1. A toothed shaft for installation into a hollow shaft with an internal toothing in which the toothed shaft can be received and to which the toothed shaft can be coupled in a positively locking fashion so as to be telescopic in a direction of a longitudinal axis, wherein the toothed shaft comprises:
a toothing region with teeth disposed on an outer circumference and extending in an axial direction; and
a shaft core in the toothing region that is overmolded by way of an injection molding process with a sliding coating comprised of thermoplastic material, wherein the sliding coating comprises at least three impressions, wherein each of the at least three impressions comprises an aperture that extends through the sliding coating to a surface of the shaft core.

2. The toothed shaft of claim 1 wherein the sliding coating comprises six impressions, wherein three of the impressions are disposed in a first radial plane and three of the impressions are disposed in a second radial plane, wherein the first radial plane is spaced apart from the second radial plane.

3. The toothed shaft of claim 1 wherein each aperture is formed in a region of a tooth flank of an adjacent core tooth of the shaft core.

4. The toothed shaft of claim 1 wherein the teeth of the toothed shaft are core teeth formed on the shaft core, wherein the core teeth are coated in the toothing region with the sliding coating.

5. The toothed shaft of claim 1 wherein the sliding coating has different wall thicknesses.

6. The toothed shaft of claim 1 wherein aside from the at least three impressions, the sliding coating has a uniform wall thickness.

7. A toothed shaft for installation into a hollow shaft with an internal toothing in which the toothed shaft can be received and to which the toothed shaft can be coupled in a positively locking fashion so as to be telescopic in a direction of a longitudinal axis, wherein the toothed shaft comprises:

a toothing region with teeth disposed on an outer circumference and extending in an axial direction; and a shaft core in the toothing region that is overmolded by way of an injection molding process with a sliding coating comprised of thermoplastic material, wherein the sliding coating comprises at least three impressions, wherein at least one of the teeth is formed completely by the sliding coating.

8. The toothed shaft of claim 7 wherein the sliding coating has a greater wall thickness at a first location where the at least one of the teeth is disposed relative to a second location of the sliding coating that does not include a tooth formed completely by the sliding coating.

9. The toothed shaft of claim 1 wherein all of the teeth are formed entirely by the sliding coating.

10. The toothed shaft of claim 1 wherein the sliding coating comprises exclusively the thermoplastic material.

11. The toothed shaft of claim 1 wherein the at least three impressions are disposed in a radial plane to which the axial direction is normal, wherein the at least three impressions are disposed uniformly over a circumference of the toothed shaft.

12. The toothed shaft of claim 1 wherein each of the apertures is disposed midway between two of the teeth in the toothing region.

13. The toothed shaft of claim 1 being free of the sliding coating at a base of each of the at least three impressions.

14. A toothed shaft for installation into a hollow shaft with an internal toothing in which the toothed shaft can be received and to which the toothed shaft can be coupled in a positively locking fashion so as to be telescopic in a direction of a longitudinal axis, wherein the toothed shaft comprises:

a toothing region with teeth disposed on an outer circumference and extending in an axial direction; and a shaft core in the toothing region that is overmolded by way of an injection molding process with a sliding coating comprised of thermoplastic material, wherein the sliding coating comprises at least three impressions, wherein a surface of the shaft core is visible through each of the at least three impressions.

15. The toothed shaft of claim 1 wherein a first impression and a second impression of the at least three impressions are disposed at a same circumferential location but are spaced apart in the axial direction.

16. The toothed shaft of claim 1 wherein a cross section of each of the at least three impressions is square.

17. The toothed shaft of claim 1 wherein a cross section of each of the at least three impressions is polygonal.

18. The toothed shaft of claim 1 wherein a first impression of the at least three impressions is disposed within 20% of a first axial end of the sliding coating based on an axial length of the sliding coating, wherein a second impression of the at least three impressions is disposed within 20% of a second axial end of the sliding coating based on the axial length of the sliding coating.

* * * * *